United States Patent
Moonka et al.

(10) Patent No.: US 8,782,696 B2
(45) Date of Patent: Jul. 15, 2014

(54) PROVIDING ADVERTISING

(75) Inventors: Rajas Moonka, San Ramon, CA (US);
Satya Patel, Foster City, CA (US);
Dmitriy Portnov, San Jose, CA (US)

(73) Assignee: Google Inc., Mountain View, CA (US)

( * ) Notice: Subject to any disclaimer, the term of this patent is extended or adjusted under 35 U.S.C. 154(b) by 1029 days.

(21) Appl. No.: 11/618,274

(22) Filed: Dec. 29, 2006

(65) Prior Publication Data

US 2008/0162277 A1  Jul. 3, 2008

(51) Int. Cl.
*G06F 3/00* (2006.01)
*G06Q 30/00* (2012.01)

(52) U.S. Cl.
USPC ........................................ 725/38; 705/14.41

(58) Field of Classification Search
CPC . G06Q 30/0242; G06Q 30/02; H04N 21/482; H04N 5/4401
USPC .......................... 705/1–20, 14.41, 14; 707/10; 725/300–350, 38
See application file for complete search history.

(56) References Cited

U.S. PATENT DOCUMENTS

| | | | |
|---|---|---|---|
| 6,188,398 B1 * | 2/2001 | Collins-Rector et al. | 725/37 |
| 2006/0015435 A1 * | 1/2006 | Nathanson | 705/37 |
| 2007/0006077 A1 * | 1/2007 | Grubbs | 715/716 |
| 2008/0004948 A1 * | 1/2008 | Flake et al. | 705/14 |

FOREIGN PATENT DOCUMENTS

| | | |
|---|---|---|
| KR | 10-2001-0094780 A | 11/2001 |
| KR | 10-0690979 | 2/2007 |
| KR | 10-2007-0038753 A | 4/2007 |
| WO | WO 2004/019171 A2 | 3/2004 |
| WO | WO 2004/028234 A2 | 4/2004 |

OTHER PUBLICATIONS

Notification of Transmittal of The International Search Report and The Written Opinion of the International Searching Authority of Application No. PCT/US2007/089068 filed Dec. 28, 2007, mailed May 30, 2008 (10 pages).

* cited by examiner

*Primary Examiner* — Sun Li
(74) *Attorney, Agent, or Firm* — Fish & Richardson P.C.

(57) ABSTRACT

The present disclosure includes a system and methods for providing advertising. In some implementations, a method includes associating a plurality of ad spaces of at least two different types as a unit. The unit is offered to one or more advertisers for purchase.

12 Claims, 3 Drawing Sheets

US 8,782,696 B2

PROVIDING ADVERTISING

TECHNICAL FIELD

This invention relates to advertising.

BACKGROUND

Content delivery over the Internet, cable, satellite, and broadcast continues to improve every day. Users can receive e-mail, news, games, entertainment, music, books, and web pages. Users may also have access to a plethora of services such as maps, shopping links, images, blogs, local search, television guides, on-demand video, satellite images, group discussions, hosted content, and e-mail. While many of the content and/or services are free to users, such content and services are often accompanied by an advertisement ("ad") that helps providers defray the cost of providing the content and services. In addition, the advertisement may also add value to the user experience.

SUMMARY

The present disclosure includes a system and methods for providing advertising. In some implementations, a method includes associating a plurality of ad spaces of at least two different types as a unit. The unit is offered to one or more advertisers for purchase.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
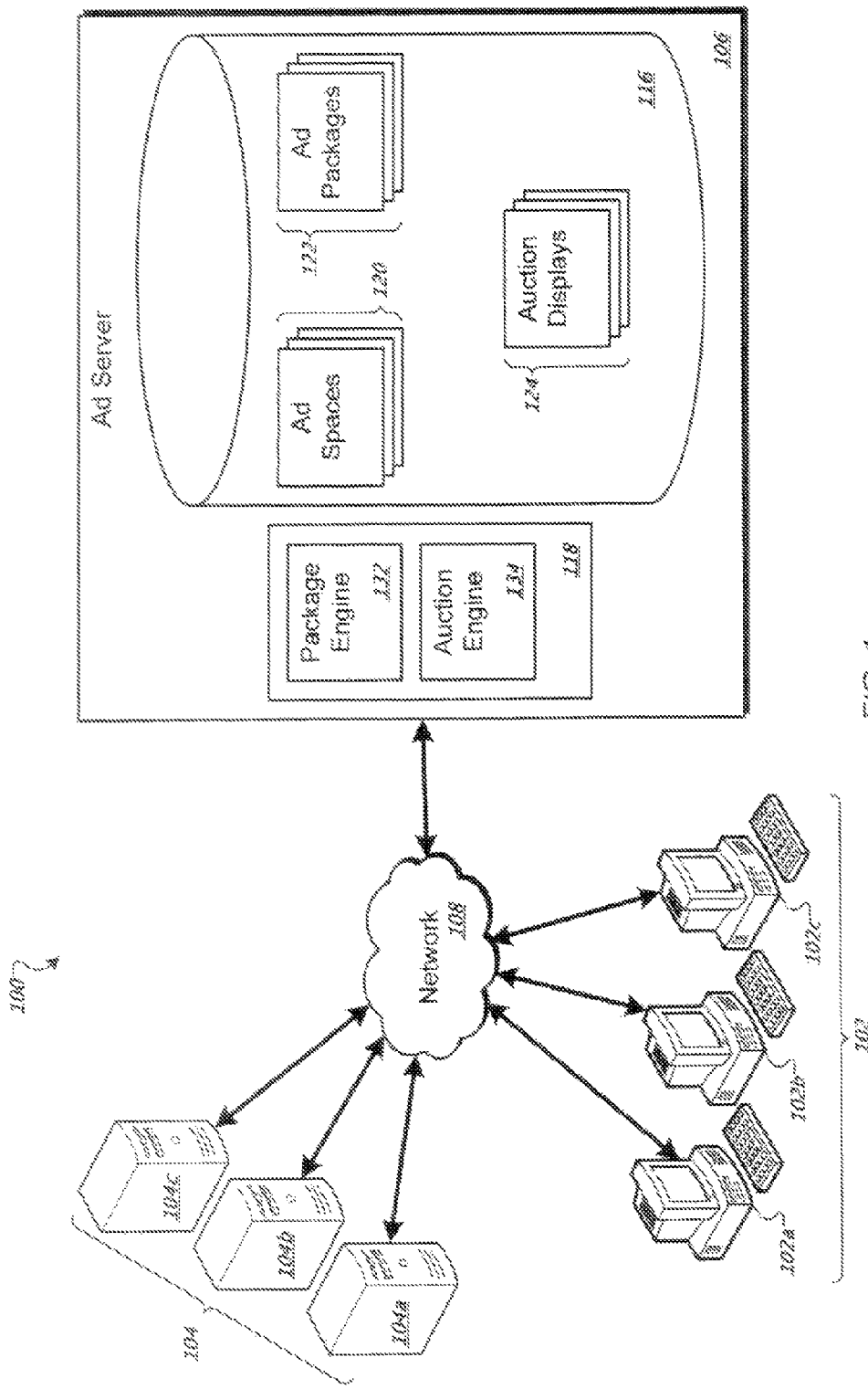
FIG. 1 is a schematic diagram showing an example of a system for auctioning in-stream ad spaces.

FIG. 1 is a schematic diagram showing an example of a system 100 for auctioning in-stream ad space. In-stream ad space may include one or more ad spaces in a video stream, audio stream, and/or audio and video stream. In general, advertisement ("ad") space may be associated with different types of media such as print media (e.g., newspaper, magazine), a website, a video stream, an audio stream, an audio/video stream, and/or any other location in presented content. Accordingly, ad spaces 120 may include different types of ad space such as in-stream ad space, Web-page ad space, print-media ad space, and/or any other ad spaces 120. In some implementations, a plurality of ad spaces 120 of different types may be associated as a unit, which then can be (e.g., auctioned) to advertisers 102. A publisher may have a rate for an advertisement based, at least in part, on attributes of an associated ad space. Such attributes may include one or more of the following: size, amount of text, publication date, publication, section in publication (e.g., News, Sports, Home & Garden), location, type of advertisement (e.g., For-Profit, Non-Profit, Government), time, date, Nielson Rating, and/or other aspects associated with an advertisement and/or publication. A publisher may be willing to sell ad space at a price less than the specified rate. In some implementation, to facilitate the offer and acceptance process in this case, the ad server 106 may provide an auction (e.g., on-line auction) of the ad spaces 120 to the advertisers 102a-c of the publishers 104a-c.

At a high level, the system 100, in some implementations, may include the advertisers 102, the publishers 104, and the ad server 106 coupled through a network 108. The advertisers 102a-c are any devices (e.g., computing devices) operable to connect or communicate with the publishers 104, the ad server 106 or the network 108 using any communication link. Each advertiser 102 includes, executes, or otherwise presents a Graphical User Interface (GUI) and comprises an electronic device operable to receive, transmit, process and store any appropriate data associated with system 100. While the illustrated implementation includes advertisers 102a-c, system 100 may include any number of advertisers 102 communicably coupled to ad server 106. Further, "advertiser 102" and "user" may be used interchangeably as appropriate without departing from the scope of this disclosure. Moreover, for ease of illustration, each advertiser 102 is described in terms of being used by one user. But this disclosure contemplates that many users may use one device or that one user may use multiple devices.

As used in this disclosure, a user of advertiser 102 is any person, department, organization, small business, enterprise, or any other entity that may use or request others to use system 100. Advertiser 102 is intended to encompass a personal computer, touch screen terminal, workstation, network computer, kiosk, wireless data port, smart phone, personal data assistant (PDA), one or more processors within these or other devices, or any other suitable processing or electronic device used by a user, for example, for viewing content from publisher 104. For example, advertiser 102 may be a PDA operable to wirelessly connect with an external or unsecured network. In another example, advertiser 102 may comprises a laptop that includes an input device, such as a keypad, touch screen, mouse, or other device that can accept information, and an output device that conveys information associated with an advertisement of ad server 106, including digital data, visual information, or GUI. Both the input device and output device may include fixed or removable storage media such as magnetic computer disk, CD-ROM, or other suitable media to both receive input from and provide output to users of advertisers 102 through the display, namely the client portion of GUI.

GUI comprises a graphical user interface operable to allow the user of advertiser 102 to interface with at least a portion of system 100 for any suitable purpose, such as bidding in an on-line auction for the ad spaces 120. Generally, GUI provides the particular user with an efficient and user-friendly presentation of data provided by or communicated within system 100. GUI may comprise a plurality of customizable frames or views having interactive fields, pull-down lists, and buttons operated by the user. For example, the GUI can be operable to display certain network ads in a user-friendly form based on the user context and the displayed data. GUI may also present a plurality of portals or dashboards. It should be understood that the term graphical user interface may be used in the singular or in the plural to describe one or more graphical user interfaces and each of the displays of a particular graphical user interface. Indeed, reference to GUI may indicate a reference to the front-end or a component of an auction engine 134, as well as the particular interface accessible via advertiser 102, as appropriate, without departing from the scope of this disclosure. Therefore, GUI contemplates any graphical user interface, such as a generic web browser or touch screen, that processes information in system 100 and presents the results to the user. Ad server 106 can accept data from advertiser 102 via a web browser (e.g., Microsoft Internet Explorer or Netscape Navigator) and return the appropriate HTML or XML responses to the browser using network 108.

Publisher 104 comprises an electronic device (e.g., computing device) operable to receive, transmit, process and store data associated with system 100. In the illustrated implementation, publisher 104 provides information associated with ad spaces 120 to ad server 106. Ad-space information comprises or otherwise identifies attributes of ad spaces 120 that may be purchased from publisher 104. For example, ad-space information may identify or include one or more of the following: a publisher, ad sizes, media types, bundled ad spaces, time, date, different sections included in the media, circulation numbers, viewer numbers, a rates quoted by the publisher 104, and/or any other parameters associated with an advertisement and/or media. In some implementations, ad-space information may include information identifying available ad space 120, packages of different ad space 120, reserves for the packages, as well as other information. In some examples, ad-space information may indicate that a publisher 104 never accepts a bid less than a certain percentage (e.g., 50%) of the specified rate. In some implementations, ad-space information may merely include a history of offers, acceptances, and/or rejections and associated parameters (e.g., offer price, ad-space attributes) for various ad space.

Ad server 106 comprises an electronic device (e.g., computing device) operable to receive, transmit, process and store data associated with system 100. Ad server 106 can be implements using computers other than servers, as well as a server pool. Indeed, as server 106 may be any computer, electronic or processing device such as, for example, a blade server, general-purpose personal computer (PC), Macintosh, workstation, Unix-based computer, or any other suitable device. In other words, ad server 106 may include computers other than general purpose computers as well as computers without conventional operating systems. Ad server 106 may be adapted to execute any operating system including Linux, UNIX, Windows Server, or any other suitable operating system. In some implementations, ad server 106 may also include or be communicably coupled with a web server and/or a mail server.

Ad server 106 includes memory 116 and a processor 118. Memory 116 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, memory 116 includes ad spaces 120, ad packages 122, auction displays 124, and content (e.g., in-print ads 125 and in-stream ads 126), but may include other information without departing from the scope of this disclosure. Here, ad space 120 refers to ad space and associated parameters for ad apace in content such as newspapers, magazines, websites, video, audio, and other media. Local memory 116 may also include any other appropriate data such as applications or services, firewall policies, a security or access log, print or other reporting files, HTML files or templates, data classes or object interfaces, child software applications or sub-systems, and others.

Ad space 120 include any parameters, pointers, variables, algorithms, instructions, rules, files, links, or other data for identifying ad space that may be purchased from publisher 104 for presenting secondary content. As discussed above, ad space 120 may include or otherwise identify one or more of the following attributes associated with ad space: size, amount of text, publication date, publication, section in publication (e.g., News, Sports, Home & Garden), location, type of advertisement (e.g., For-Profit, Non-Profit, Government), duration, television shown, time, date, in-stream location, and/or other aspects associated with an advertisement and/or publication. For example, ad space 120 may identify a newspaper, sections, sizes, days, rate cards, and other parameters associated with advertising in the newspaper. In another example, ad space 120 may identify a video, an in-stream location, date, time, specified amount, and other parameters associated with a streaming video. In some implementations, ad space 120 may identify mathematical and/or logical expressions for determining a rate for a certain type of ad space. For instance, ad space 120 may identify a value associated with each of the various attributes and the expression may determine the rate using these values and an associated expression. Each ad space 120 may be associated with a specific publisher, a specific publication, a specific network, a specific video, and/or a plurality of ad space 120 may be associated with a single publisher, a single publication a specific network, or a specific video. In some implementations, ad space 120 may be formatted, stored, or defined as various data structures in text files, eXtensible Markup Language (XML) documents, virtual Storage Access method (VSAM) files, flat files, Btrieve files, comma-separated-value (CSV) files, internal variables, or one or more libraries. For example, a particular ad space 120 may merely be a pointer to a third party ad space file stored remotely. In short, ad space 120 may comprise one table or file or a plurality of tables or files stored on one computer or across a plurality of computers in any appropriate format. Indeed, some or all of ad space 102 may be local or remote without departing from the scope of this disclosure and store any type of appropriate data.

Processor 118 executes instructions and manipulates data to perform operations of ad server 106. Although FIG. 1 illustrates a single processor 118 in server 106, multiple processors 118 may be used according to a particular needs, and reference to processor 118 is meant to include multiple processors 118 where applicable. In the illustrated implementation, processor 118 executes a package engine 132 and an auction engine 134 at any appropriate time such as, for example, in response to a request or input from a user of server 106 or any appropriate computer system coupled with network 108.

The package engine 132 includes any software, hardware, and/or firmware, or combination thereof, operable to associated one or more ad spaces 120 as an ad package 122 or unit to be sole (e.g., auctioned) to the advertisers 102. For example, the package engine 132 may associate, as ad package 122, an in-print ad space 120 and an in-stream ad space 120 of a publisher 104 for auction to advertisers 102. In general the package engine 132 may perform one or more of the following functions: automatically generates one or more ad packages 122 in response to an event (e.g., request, period of time, receipt of ad space 120), identifies one or more ad spaces 120 associated with a publisher 120, associates one or more ad spaces 120 based on appropriate parameter(s) (e.g., date of display, proximity of media), and/or other functions using ad space 120. In some implementations, the package engine 132 associates the ad space 120 in the ad package 122 with a period of time for simultaneously displaying ads in the ad spaces 120. For example, the package engine 132 may associate a banner ad space 120 and an in-stream ad space 120 for displaying a banner while presenting an in-stream ad. For example, the in-stream ad space 120 may be associated with a computer monitor, a display in a lobby, a television, or other suitable displays. In some implementations, the package engine 132 associates the ad package 122 with a geographic location for proximately displaying the ad spaces 120. For example, the package engine 132 may associate a banner ad space 120 and an in-stream ad space 120 such that a banner ad is displayed on a PDA and an in-stream ad is presented on a display in a lobby in response to the PDA and the display being within a specified proximity. In some implementations, the package engine 132 may predict or estimate the number of avails associated with the ad packages 122. In some implementations, the package engine 132 may associate ad spaces 120 that are a surplus that the publisher 104 was unable or did not directly sell to advertisers 102.

The auction engine 132 includes any software, hardware, and/or firmware, or combination thereof, operable to present ad packages 122 to advertisers 102 for sale (e.g., auction). Though reference is made to an auction, other forms of transactions are contemplated including direct sales, reservations, and the like. The auction engine 134 may populate an auction display 124 with information from one or more ad packages 122 for presenting through and receiving bids through GUI 110. In general, the auction engine 134 may perform one or more of the following functions: receive a request for available packages from advertisers 102, identify one or more ad packages 122 based, at least in part, on the request, identify at least one auction display 124 for presenting information associated with identified ad packages 122, populate an auction display 124 in accordance ad packages 122, and transmit the auction display 124 including information at least associated with the ad packages 122 to advertisers 102. In some implementations, the auction engine 134 presents the ad packages 122 to advertisers 102 in the auction displays 124. The auction displays 124 may allow advertisers 102 to bid on ad packages 122 provided by the publishers 104. In some implementations, the publishers 104 directly sell ad space to the advertisers 102 and provide the remaining ad space to the ad server 106 to auction ad packages 122 using the auction engine 134. Alternatively or in combination, the publishers 104 may directly sell some of the ad spaces after or during the on-line ad auction, such as by directly selling the remaining ad spaces after the auction engine 134 processes bids from the advertisers 102.

Regardless of the particular implementation, "software," as used herein, may include software, firmware, wired or programmed hardware, or any combination thereof as appropriate. Indeed, the package engine 132 and the auction engine 134 may be written or described in any appropriate computer language including C, C++, Java, J#, Visual Basic, assembler, Perl, any suitable version of 4GL, as well as others. It will be understood that while the package engine 132 and the auction engine 134 are illustrated in FIG. 1 as modules, each of the package engine 132 and the auction engine 134 may include numerous sub-modules or may instead be a single multi-tasked module that implements the various features and functionality through various objects, methods, or other processes. Further, while illustrated as internal to server 106, one or more processes associated with the package engine 132 and/or the auction engine 134 may be stored, referenced, or executed remotely. Moreover, the package engine 132 and/or the auction engine 135 may be a child or sub-module of another software module or enterprise application (not illustrated) without departing from the scope of this disclosure.

Ad server 106 may also include an interface for communicating with other devices, such as advertisers 102, over network 108 in a client-server or other distributed environment. In some implementations, ad server 106 receives data from internal or external senders through the interface for storage in local memory 116 and/or processing by processor 118. Generally, the interface comprises logic encoded in software and/or hardware in a suitable combination and operable to communicate with network 108. More specifically, the interface may comprise software supporting one or more communications protocols associated with communications network 108 or hardware operable to communicate physical signals.

Network 108 facilitate wireless or wireline communication between server 106 and any other local or remote device, such as advertisers 102. Network 108 may be all or a portion of an enterprise or secured network. While illustrated as single network, network 108 may be a continuous network logically divided into various sub-nets or virtual networks without departing from the scope of this disclosure, so long as at least portion of network 108 may facilitate communications between server 106 and at least one advertiser 102. In some implementations, network 108 encompasses any internal or external network, networks, sub-network, or combination thereof operable to facilitate communications between various devices in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, one or more publishers 104 transmit information identifying available ad space to ad server 106. The ad server 106 generates and/or updates one or more ad spaces 120 based, at least in part, on the received information. In response to an event (e.g., request, period of time, receiving ad space information), the package engine 132 identifies ad spaces 120 and generates one or more ad space packages 122 based on any appropriate criteria (e.g., date, time, location). In response to at least a request from an advertiser 102, the auction engine 134 may identify one or more ad packages 122 based, at least in part, on the request. For example, the request may identify a television show, a video, and/or other multimedia. Using the request, the auction engine 134 may identify one or more ad packages 122 including ad space 120 in the identified media. The auction engine 134 identifies at least one auction display 124 for presenting ad packages 122 and receiving bids for ad packages 122. The auction engine 134 transmits the auction display 124 to the requesting advertiser 102 to receive bids for ad packages 122.

Figure 2:
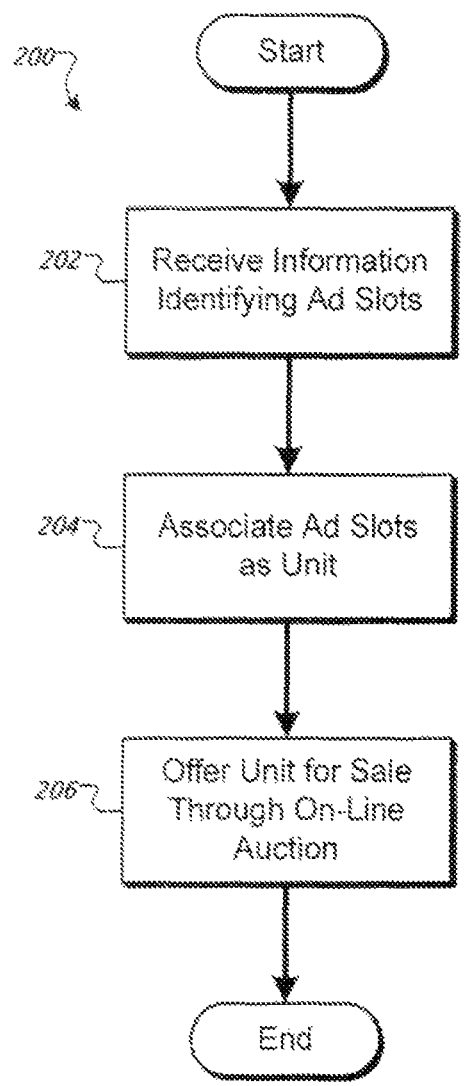
FIG. 2 is a flow chart showing an example of a process for auctioning in-stream ad spaces.
Figure 3:
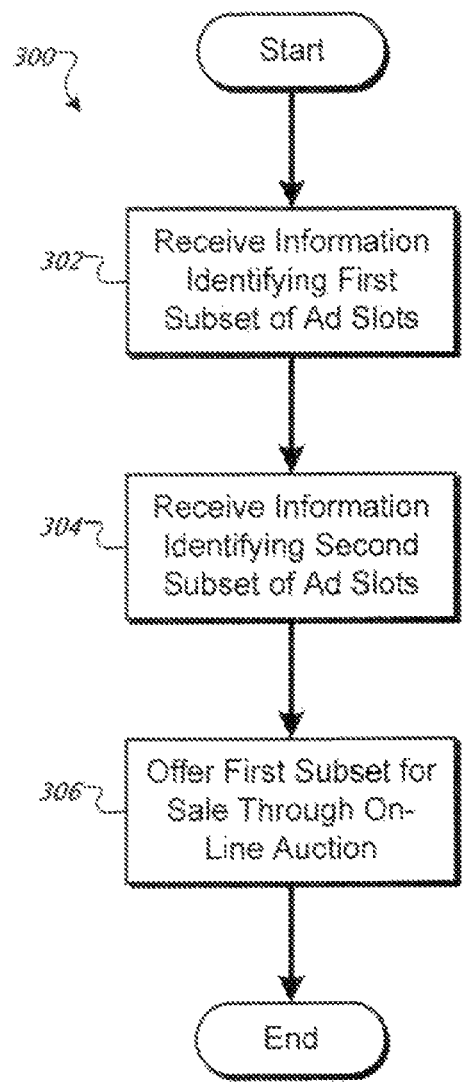
FIG. 3 is a flow chart showing an example of a process for auctioning a surplus of ad spaces.

FIGS. 2 and 3 are flow charts showing examples of methods 200 and 300, respectively. The methods 200 and 300 may be performed, for example, by a system such as the system 100 and, for clarity of presentation, the description that follows uses the system 100 as the basis of an example for describing the methods 200 and 300. However, another system, or combination of systems, may be used to perform the methods 200 and 300.

FIG. 2 is a flow chart illustrating an example method 200 for auctioning in-stream ad spaces or ad spaces. The process 200 begins at step 202 where information identifying ad spaces associated with a publisher is received. For example, the ad server 106 may receive information from the publisher 104a identifying ad spaces associated with the publisher 104a. Alternatively or in combination, a third party may send information regarding ad spaces that the third party provides and the third party ad spaces are associated with content provided by the publisher 104a. The ad server 106 stores the ad space information in one or more ad spaces 120. One or more ad spaces 120 may identify in-stream ad spaces, such as an ad space in a video presentation or an audio presentation. In some implementations, one or more ad spaces 120 identify an in-page ad space, such as an ad space on a web page.

At step 204, one or more ad spaces are associated as a unit. For example, the package engine 132 may associate one or more ad spaces 120 as an ad unit such as ad packages 122. In some implementations, the association may include a period of time for simultaneously displaying ads in the associated ad spaces in two or more different media types, such as a web page and a video presentation. For example, an Internet café can present in-stream ad spaces using a video presentation device and in-print ad spaces in a web page using a computer device. In some implementations, the two or more media types, such as the in-stream ad space and the in-page ad space, are associated with a geographic location for proximately displaying ads, such as the video presentation device and the computer device in the Internet café. The ad units are presented for sale (e.g., auction) to one or more advertisers at step 206. For example, the auction engine 134 may identify an auction display 124 for presenting the ad packages 122 to the advertisers 102.

FIG. 3 is a flow chart showing an example method 300 for selling (e.g., auctioning) ad space, so as to, for example, dispose of a surplus of ad spaces. Method 300 begins at step 302 where information identifying a first subset of ad spaces associated with a publisher is identified. For example, the ad server 106 may receive from the publisher 104a information regarding a first subset of ad spaces. At step 304, information identifying a second subset of ad spaces (e.g., those sold by the publisher) is received. For example, the ad server 106 may receive, from the publisher 104a, information indicating a second subset of the ad spaces where sold directly to advertisers 102. The first subset of ad spaces are offered for sale (e.g., through an online-auction) at step 306. For example, the auction engine 134 may present the first subset of the ad spaces 120 through one or more auction displays 124. The advertisers 102 may provide the in-print ads and the in-stream ads for presentation in the ad spaces 120. Alternatively or in combination, the publishers 104 may compete for ad placements in the ad spaces 120 and/or ad packages 122 with the publisher 104.

Although this disclosure has been described in terms of some implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer implemented method, comprising:
    identifying a first space in unsold ad spaces in video content;
    determining, by a processor, a type associated with the first space;
    identifying a second different space in the unsold ad spaces;
    determining, by a processor, a type associated with the second different space, wherein the type associated with the first space is different than the type associated with the second different space;
    determining, by a processor, that a time for presentation of content in the first space is concurrent with a time for presentation of content in the second different space;
    bundling the first space and the second different space to form a unit that will enable a single purchaser to present content in both the first space and the second different space at a same time;
    offering the unit to one or more advertisers through an on line auction; and
    selling the unit to the single purchaser based on results of the on line auction.

2. The method of claim 1, wherein the at least one of unsold ad spaces comprises an ad space for presenting an advertisement through a stand-alone display or an ad space for presenting an advertisement through a computer in response at least to a proximity of the computer to the standalone display.

3. The method of claim 1, wherein the unit is associated with a period of time for simultaneously displaying at least two advertisements through different types of media.

4. The method of claim 1, wherein the unit is associated with a geographic location for proximately displaying two advertisements through different types of media.

5. The method of claim 1 wherein bids in the online auction below a certain percentage of a specified rate are not accepted.

6. The method of claim 1 wherein one or more of the plurality of unsold ad spaces is associated with a formula for determining a rate.

7. A system comprising:
    storage media having instructions encoded thereon;
    one or more processors operable to execute the instructions to perform operations comprising:
        identifying a first space in unsold ad spaces;
        determining a type associated with the first space;
        identifying a second different space in the unsold ad spaces;
        determining a type associated with the second different space, wherein the type associated with the first space is different than the type associated with the second different space;
        determining that a time for presentation of content in the first space is concurrent with a time for presentation of content in the second different space;
        bundling the first space and the second different space to form a unit that will enable a single purchaser to present content in both the first space and the second different space at a same time;
        offering the unit to one or more advertisers through an on line auction; and
        selling the unit to the single purchaser based on results of the on line auction.

8. The system of claim 7, wherein the at least one of the unsold ad spaces comprises an ad space for presenting an advertisement through a stand-alone display or an ad space for presenting an advertisement through a computer in response at least to a proximity of the computer to the stand alone display.

9. The system of claim 7, wherein the unit is associated with a period of time for simultaneously displaying at least two advertisements through different types of media.

10. The system of claim 7, wherein the unit is associated with a geographic location for proximately displaying two advertisements through different types of media.

11. The system of claim 7 wherein bids in the online auction below a certain percentage of a specified rate are not accepted.

12. The system of claim 7 wherein one or more of the plurality of unsold ad spaces is associated with a formula for determining a rate.

\* \* \* \* \*

UNITED STATES PATENT AND TRADEMARK OFFICE
CERTIFICATE OF CORRECTION

| | | |
|---|---|---|
| PATENT NO. | : 8,782,696 B2 | Page 1 of 1 |
| APPLICATION NO. | : 11/618274 | |
| DATED | : July 15, 2014 | |
| INVENTOR(S) | : Moonka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,160 days.

Signed and Sealed this
First Day of December, 2015

Michelle K. Lee
*Director of the United States Patent and Trademark Office*